United States Patent [19]

Eizenhöfer et al.

[11] Patent Number: 5,008,883
[45] Date of Patent: Apr. 16, 1991

[54] COMMUNICATION SYSTEM

[75] Inventors: Alfons Eizenhöfer, Altdorf; Georg Von Harten, Nürnberg, both of Fed. Rep. of Germany

[73] Assignee: U.S. Philips Corporation, New York, N.Y.

[21] Appl. No.: 339,275

[22] Filed: Apr. 14, 1989

[30] Foreign Application Priority Data

Apr. 28, 1988 [DE] Fed. Rep. of Germany ....... 3814355

[51] Int. Cl.$^5$ ................................. H04J 3/00
[52] U.S. Cl. .................................. 370/95.1
[58] Field of Search ............... 370/85.6, 95.1, 95.3, 370/29, 32, 79

[56] References Cited

U.S. PATENT DOCUMENTS

| 4,573,207 | 2/1986 | Smith et al. | 455/54 |
| 4,736,371 | 4/1988 | Tejima et al. | 370/95.1 |
| 4,745,600 | 5/1988 | Herman et al. | 370/95.1 |
| 4,815,073 | 3/1989 | Grauel et al. | 370/95.1 |
| 4,817,089 | 3/1989 | Paneth et al. | 370/95.1 |

FOREIGN PATENT DOCUMENTS 1566305 4/1980 United Kingdom ............ ⊚

Primary Examiner—Douglas W. Olms
Assistant Examiner—Melvin Marcelo
Attorney, Agent, or Firm—Anne E. Barschall

[57] ABSTRACT

In a communication system having at least a central arrangement and a plurality of mutually independent subscriber stations, a subscriber station, after transmitting a request for access, expects an authorization for access to be granted by the central arrangement. For this purpose it is proposed that the subscriber station repects its request for access once it has established that a further subscriber station, which transmitted its request for access at a later instant, recesses and authorization for access.

15 Claims, 2 Drawing Sheets

COMMUNICATION SYSTEM

The invention relates to a communication system having at least one central arrangement and a plurality of mutually independent subscriber stations, in which a subscriber station, after transmission of a request for access, awaits an authorization for access to be granted by the central arrangement.

From DE-OS 31 33 347.8 is known a method of accessing transmission channels of a communication system having at least one central arrangement, with at least one duplex transmission channel and a plurality of mutually independent subscriber stations, in which each subscriber station can access the duplex transmission channel in accordance with a multiple access method.

The communication system described in this document is a system for transmitting messages through radio lines with stationary radio stations and mobile subscriber stations. Each stationary radio station (central arrangement) has been assigned a set of duplex transmission channels. One of these channels (the control channel) is used for transmitting control information for the course of the operations and the remaining channels (voice channels) are used for voice communication.

In the sequel, the first channel of the control channel, through which the subscriber stations transmit their control information to the central arrangement, is denoted forward channel, whereas the second channel, through which the central arrangement transmits its control information to the subscriber stations, is denoted return channel. The forward channel and the return channel of the control channel are subdivided into time slots, whereas the time slots of the forward channel can again be subdivided into a plurality of call slots for better exploitation. For establishing a connection for a call with a telephone subscriber in a telephone network or a subscriber station, which call is desired by another subscriber station, the subscriber station selects one of these call slots at random. In order to enhance the effectiveness of the forward channel, the subscriber station does not transmit its full identification code, however, whose signal length would require a plurality of call slots, but a shortened signal which is the same for all subscriber stations.

This shortened signal notifies the central arrangement that there is a wish for setting up a connection for a call on the part of a subscriber station. If a plurality of shortened signals have been received in a single time slot of the central arrangement, the arrangement selects one of these subscriber stations. This subscriber station can unequivocally be defined on account of the number of the call slot in which it has transmitted. Subsequently, the central arrangement transmits a request for identification to the subscriber station. This request contains the number of the call slot in which this subscriber station has transmitted its shortened signal. The shortening of the time period necessary for the individual requests for access thus reduces the risk of access disturbances and hence reduces the period of time during which the forward channel of the control channel can only be used to a limited extent.

Each subscriber station that has transmitted a shortened signal in a call slot and is not invited to transmit its complete identification code within a presettable time interval, is to repeat its request for access by again transmitting its shortened signal.

The forward and return channels of the duplex transmission channel described in the document discussed hereinbefore are formed by two frequencies that are different. However, duplex transmission channels can also be formed by positions in time, while each channel is assigned a time slot and a plurality of time slots are combined in a time frame. The time frames can again be organized in only a single position with respect to frequency and also in various positions with respect to frequency.

It is an object of the present invention to improve a communication system of the type mentioned in the first paragraph in a manner such that access times can be reduced and the loading capacity of the control channel enhanced.

Based on the communication system mentioned in the first paragraph, this object is achieved in that the subscriber station repeats its request for access, once it has established that another subscriber station, which transmitted its request for access at a later instant, receives an authorization for access.

In another aspect of the invention, when authorization of different priorities are used, the subscriber station repeats the request for access, once it has established that another subscriber station of identical or lower priority, which transmitted its request for access at a later instant, receives an authorization for access. This aspect provides an organization of the communication system in which the subscriber stations are classified according to various priority levels.

In yet another aspect of the invention, there is a presettable time interval between the reception of the request for access and the granting of the authorization for access. In still another aspect of the invention, the subscriber station, which transmitting a request for access, stores an identification code which indicates the time rank of this request for access in the order of the requests for access from further subscriber stations occurring on the control channel. These aspect of the invention provide an organization of the communication system in which a load control inside the central arrangement is made possible as a result of the way in which authorizations for access are granted.

Further advantageous embodiments of the invention are discussed in the following.

Further details of the embodiments of the invention will be described and explained with reference to the drawing represented in the Figures, in which.

A preferred embodiment of a communication system having at least one central arrangement and a plurality of mutually independent subscriber stations, in which a subscriber station, after transmitting a request for access, expects an authorization for access from the central arrangement, is a radio telephone system with mobile subscriber stations. The implementation of the invention is not restricted to such a radio telephone system, however, but can also be used, for example, in satellite communication systems or also in computers forming an array for a local area network.

In the discussed radio telephone system a plurality of mutually independent subscriber stations, denoted mobile stations hereinafter, are moving in the radio coverage area of a central arrangement, which will be denoted base station hereinafter. The radio coverage area of the base station is, for example, the radio cell in a cellular car telephone network, such as, for example, the planned Paneuropean D network. The radio traffic between the mobile stations and the base station is effected over a restricted number of duplex transmission channels. One of these duplex transmission channels is designed to be a control channel.

Figure 1:
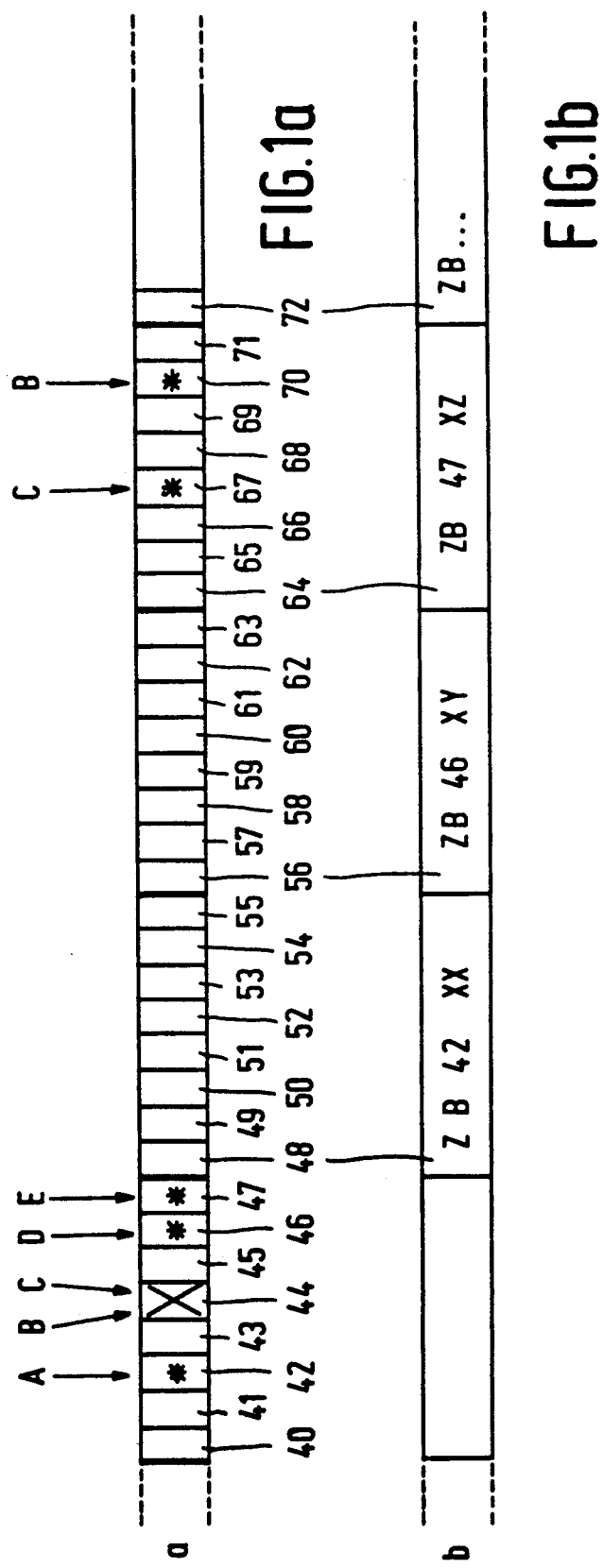
FIGS. 1a and 1b shows in a diagram a time slot of the control channel.

FIG. 1 shows in a time section the dialog on the control channel. The control channel is subdivided into time slots. Line a in FIG. 1 shows the forward channel of the control channel, through which the mobile stations transmit, and line b in FIG. 1 shows the return channel through which the base station transmits. All mobile stations that wish to set up a connection for a call, are first in the so-called call state, in which they transmit a request for access through the forward channel.

Since these requests for access would overlap if a plurality of requests for access were transmitted simultaneously, and only a single request for access could come through the time slot, each time slot is subdivided into eight call slots. By means of the synchronizing signals transmitted by the base station each call slot is continuously numbered consecutively. On the basis of this call slot number, this call slot is unequivocally distinguishable both for the base station and for all mobile radio stations. Because the total amount of call slot numbers becomes too large in time, the number of the next call slot in the embodiment is again started with zero after a presettable maximum value has been reached.

The request for access of a mobile station consists of a shortened signal whose signal length requires only a single call slot for transmission. A random number generator arranged in the mobile station determines in which call slot each mobile station transmits. In this way it will be highly probable for several requests for access to reach the base station without any conflicts. On line a of FIG. 1 a mobile station A is transmitting in call slot number 42, a mobile station D in call slot number 46 and a mobile station E in call slot number 47. In call slot number 44 two mobile stations B and C have simultaneously transmitted a request for access. If the two requests for access enter the base station with virtually the same field strengths, there will be a conflict over access marked X in time slot number 44. Conflicts over access are ignored by the base station.

Figure 2:
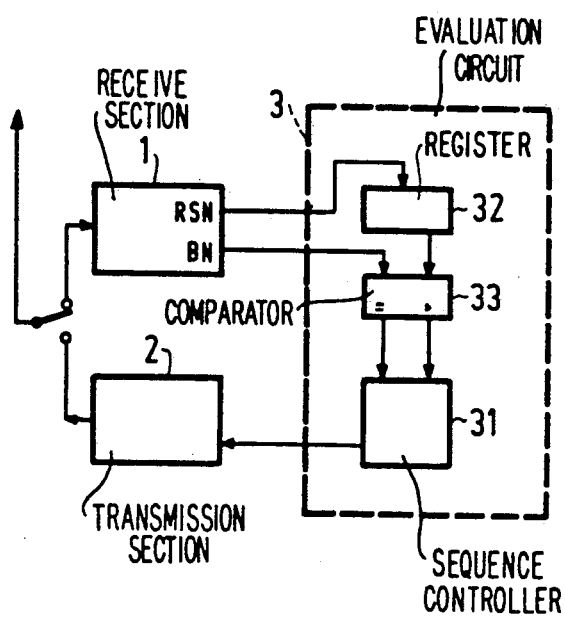
FIG. 2 shows a block diagram of a mobile station.

FIG. 2 shows a block diagram of a mobile station comprising a receive section 1, a transmission section 2 and an evaluation circuit 3. The transmission of requests for access is triggered by means of a sequence controller 31 included in the evaluation circuit 3. A synchronizing arrangement (not shown) included in the receive section 1 supplies at the output RSN of the receive section 1 the instantaneous call slot number granted by the base station. When the request for access is transmitted, this instantaneous call slot number is stored in a register 32. Thus, each mobile station will remember the call slot number in which it has transmitted its wish for access. The register 32 of the mobile station A thus contains the call slot number 42, the registers of mobile stations B and C the call slot numbers 44 etc.

Once the request for access has been transmitted, the mobile stations are transferred from the call state to the queue state by means of the sequence controller 31. In the queue state they await an authorization for access addressed to them by the base station, with which authorization a voice channel is assigned to them through which they can continue setting up a connection for a call.

The requests for access received by the base station without a conflict, marked * on line a of FIG. 1, are processed in the order in which they are received. Since the received shortened signal does not contain any information about the subscriber station that has transmitted this signal, the call slot number presented by the base station at the moment when a shortened signal is received is used as an aid for distinguishing the calling mobile stations. Each request for access is managed under this call slot number in a data store at the base station.

Since this stored call slot number is likewise used for forming the order in which the mobile stations are granted their authorizations for access, the call slot numbers managed by the base station will be denoted authorization numbers hereinafter.

The base station consecutively transmits an authorization for access ZB to the mobile stations A, D and E in the order in which conflict-free requests for access arrive. For this purpose, each authorization for access contains the authorization number allocated to each request for access. In the time slot, which starts with the call slot number 48, the base station therefore transmits an authorization for access ZB, which contains the authorization number 42 and the channel number XX of a free voice channel.

The call slot number contained in the authorization for access is evaluated by all the mobile stations A, B, C, D and E which are still in the queue state, and transferred to a further output BN of the receive section 1. This output BN is connected to a first input of a comparator 33. A second input of the comparator 33 is connected to the output of the register 32. The comparator 33 comprises two outputs which are connected to the sequence controller 31. If the two numerical values available at its outputs correspond, the controller will furnish a signal at its first output. If the numerical value at its first input exceeds the numerical value which is available at its second input, it will furnish a signal at its second output.

In this manner all mobile stations A, B, C, D and E which are in the queue state compare the authorization number received together with the authorization for access with their individual call slot numbers stored in register 32. Only the mobile station A will find these two numbers to correspond. By means of the signal at the first output of the comparator 33 the sequence controller 31 is ordered to leave the queue state and proceed with the call with the base station through the voice channel XX allocated thereto in the authorization for access.

All mobile stations which receive authorizations for access containing an authorization number which is lower than the stored call slot number, remain in the queue state. They are the mobile stations B, C, D and E. During the queue state they do not transmit any renewed requests for access. In this way the control channel is not occupied by the mobile stations which are in the queue state, not even when they are to wait for a longer period of time as a result of a large number of requests for access from further mobile stations. This is advantageous in that the load of the control channel, especially in times when there are many requests for access, can be maintained at the lowest possible level and thus fewer access conflicts of calling mobile stations are to be expected.

The next authorization number allocated to the request for access managed by and received in the base station has the numerical value 46. The next authorization for access which is transmitted from the base station in the time slot which starts with the call slot number 56, contains for this purpose the authorization number 46 and the channel number XY of a free voice channel. The mobile station D then knows that it may proceed with its call on the voice channel XY indicated in the authorization for access.

By comparing the authorization number 46 to the individually stored call slot number 44 the mobile stations B and C will establish that they have been ignored. For them this is the sign that their requests for access could not be received by the base station. Only now will the two mobile stations B and C leave their queue state, as a consequence of the output signal of the second output of comparator 33, and will they be moved back into the call state by the sequence controller 31. In one of the next call slots they will again transmit a request for access. Owing to the random number generator arranged in the sequence control circuit it will be highly probable for the mobile stations B and C to transmit, but then in different call slots, for example in the call slots numbered 67 and 70 and thus to avoid, at least mutually, a conflict over access.

In this way it is avoided that mobile stations whose requests for access cannot reach the base station, can establish this for themselves and transmit a request for access once again. In an advantageous way, however, only those mobile stations will then transmit a renewed request for access, irrespective of the period of time during which they have had to wait for an authorization for a call, when their requests for access have really not reached the base station. Furthermore, the authorization for a call does not need to contain additional information for controlling the mobile stations which are in the queue state, so that the occupation of the return channel is not enhanced by this. The load of the forward channel and the number of access conflicts, however, is reduced.

With the described arrangement a so-called load control of the radio telephone network is possible. If a great many requests for access from mobile stations arrive at the base station, the base station causes the transmission of authorizations for calls to be delayed, without the danger of the mobile stations in the queue state blocking the forward channel with renewed requests for access.

In a further arrangement (not shown) of the embodiment a timing circuit is arranged in each mobile station. This timing circuit is started when a request for access is transmitted. If the mobile station, on the basis of its request for access, receives an authorization for access meant for this station, the timing circuit will be reset. If the period of time preset with the aid of the timing circuit elapses, whereas the station is still in the queue state, it will again be moved back into the call state by the timing circuit. In this way it is ensured that mobile stations whose requests for access have been lost and which cannot detect this, because no authorizations for access have been granted in the meantime, again transmit a request for access after a presettable queue time has passed. The presettable period of time of this timing circuit depends on the planned load of the control channel. In the embodiment of the invention this is on the order of ten seconds.

In a further embodiment of the invention the base station transmits over large distances in time an authorization for a call together with the instantaneous call slot number. Since no request for access has preceded this authorization, it is denoted a pseudo-authorization for a call. In this way it is ensured that even in times when only a small number of requests for access or none at all are received, mobile stations, whose requests for access could not be received, receive an authorization number by means of this pseudo-authorization, on the basis of which they can recognize the loss of their request for access and after that transmit a renewed request for access. Transmitting such a pseudo-authorization for access is advantageous in that the circuitry for the timing circuit to be arranged in each mobile station can be omitted and the loss of a call can be detected with no more than the already described circuit arrangement for detecting an authorization for a call.

The order of access of the mobile stations in the described radio telephone system is oriented on an absolute numbering of the call slots by means of call slot numbers transmitted by the base station, for example, in synchronizing signals. However, also the system time of the radio telephone system can be used as an absolute numbering In the circuit arrangement described hereinafter a relative numbering is used in lieu of an absolute numbering. For the relative numbering of a request for access the time interval between the request for access and the received authorization for access or an equivalent magnitude, for example, the number of intermediate time slots, is used.

Figure 3:
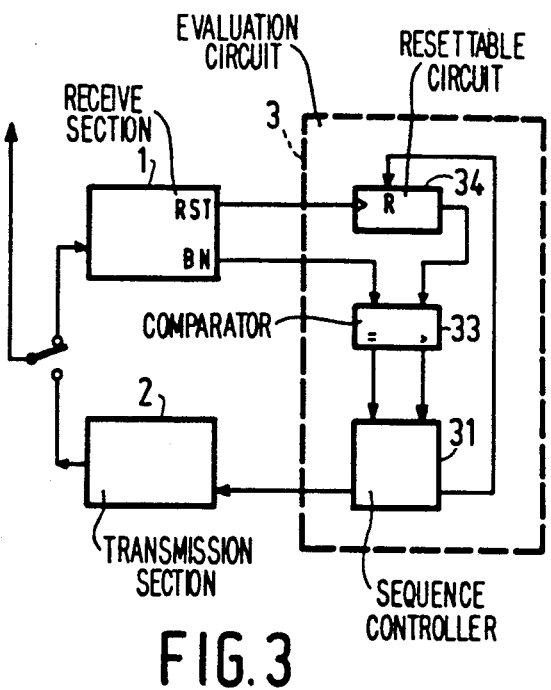
FIG. 3 shows a further block diagram of a mobile station.

In the mobile station represented in FIG. 3 a clock generator circuit contained in the synchronizing portion of the receive section 1 produces an output pulse at the beginning of a call slot, which pulse is applied to a counter 34 via the output RST of the receive section 1. The clock generator circuit is synchronized with the base station. Such a clock generator circuit is generally contained in each mobile station, so as to ensure time-synchronous transmission of, for example, the request for access. A reset input R of the counter 34 is connected to the sequence controller 31, which corresponds with the sequence controller represented in FIG. 2 as regards function and structure. Owing to the sequence controller signal available at the reset input of the counter 34, the counter output of the counter 34 retains the zero state until the sequence controller 31 has transmitted a request for access. Now the count at the counter input of the counter 34 is incremented by one at each clock pulse. The counter output of the counter 34 is connected to a first input of a comparator 33. The authorization number contained in the received authorization for access is applied to the second input of the comparator 33 via the output BN of the receive section 1 via the evaluation circuit contained in the receive section 1. The comparator 33 produces two output signals. At its first output an output signal is produced when the count of the counter 34 and the number of the authorization correspond. At its second output an output signal is produced when the count of the counter 34 exceeds the received authorization number. These two signals are applied to the sequence controller 31 and induce the state changes already described, such as call state, queue state etcetera. When a request for access is transmitted, the counter 34 starts counting the expired call slots. On transmission of an authorization for access, the base station detects in the authorization for access the number of call slots which are situated between the reception of the request for access inducing this authorization for access and the transmission of this authorization. For this purpose the instantaneous number of the call slot is stored in the base station in the embodiment of the invention in parallel with the storing of the request for access. When the authorization for access is transmitted, the number of expired call slots is averaged from the difference between the then instantaneous call slot number and the stored call slot number.

Relative Numbering as against Absolute Numbering is advantageous in that the circuitry in the mobile station can be reduced, because only a single call slot clock signal is to be derived from the received synchronizing signals, which clock signal is needed anyhow for synchronizing the call slots. Consequently, the synchronizing signals need not contain the call slot numbers. This entails a reduction of the data to be transmitted with the synchronizing signals as well as a reduction of the overall system circuitry.

On the basis of the signal processing times the transmission of the authorization for access can be shifted by several time slots. The consequent necessary correction by the number of call slots, which is effected between the computation of the number of call slots and the transmission of the authorization for access, is to be taken into account accordingly. The simplest way in which this can be realised is adding a corresponding correction value when the number of the call slots is computed in the base station.

In the radio telephone system depicted in this document all mobile stations have the same authorization. Consequently, the authorizations for access are distributed in the order of arrival of the requests for access.

In a further embodiment of the invention the mobile stations are subdivided into various priority levels. A mobile station of higher priority is to receive its authorization for access over a mobile station having a lower priority. It is possible, however, that the priority of a mobile station is different from one request for access to the next. For example, any mobile station may claim the highest priority for an emergency call irrespective of the level of priority assigned to that station.

Figure 4:
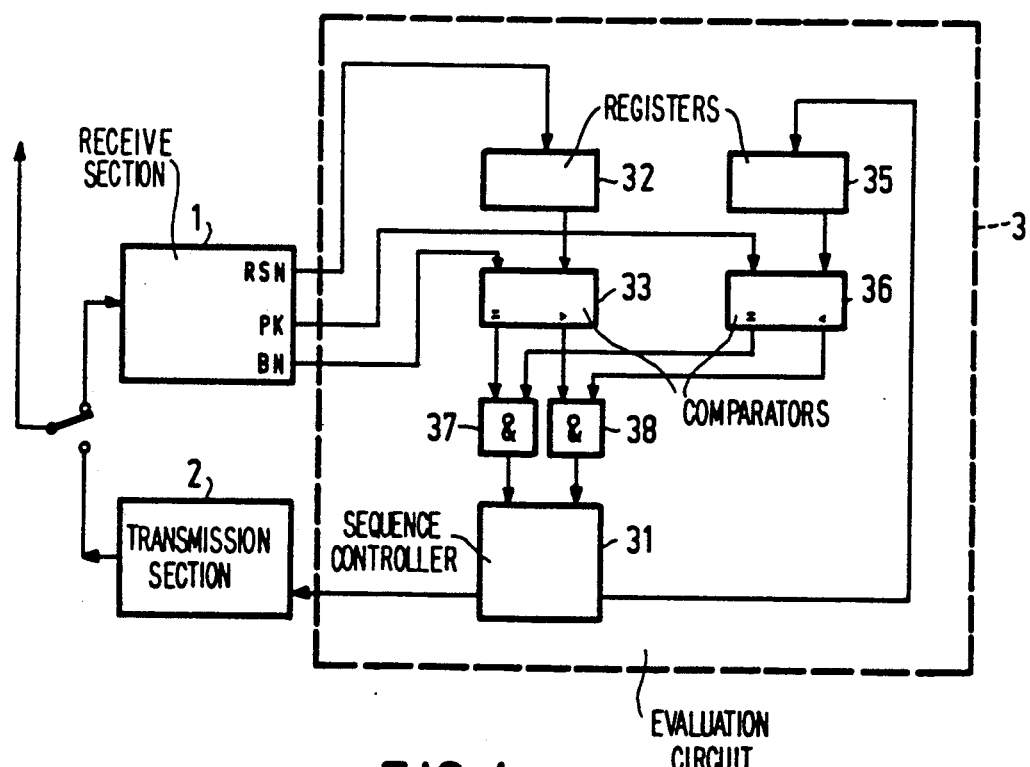
FIG. 4 shows yet a further block diagram of a mobile station.

FIG. 4 shows a block diagram of a mobile station in which such priority levels can be taken into account. The embodiment represented in FIG. 4 is based on the embodiment represented in FIG. 2 and is additionally provided with switching means which are required for taking the priority levels into account.

For this purpose each mobile station stores, in addition to the call slot number in the register 32, the priority of its request for access in a second register 35. The output of the register 35 is connected to the input of a second comparator 36. The requests for access are processed by the mobile station in accordance with their priorities and priority levels in the order of arrival at its input. Therefore, in the authorization for access the priority of the specific access is indicated simultaneously. The priority level contained in the authorization for access is averaged in the evaluation circuit included in the receive section 1 and applied to a second input of the second comparator 36 via an output PK. A loss of its own request for access is detected in the mobile station when it receives from the base station an answer whose call slot number exceeds that of its stored call slot number whereas at the same time the received priority level is lower than or equal to the stored priority level. In that case the mobile station again changes from its queue state to the call state. For this purpose the outputs of the comparator 33 and the second comparator 36 are combined by means of AND gates 37 and 38 respectively.

We claim:

1. A communication system having at least one central arrangement and a plurality of mutually independent subscriber stations, in which a subscriber station, after transmission of a request for access, awaits an authorization for access to be granted by the central arrangement, characterized in that the subscriber station repeats its request for access, once it has established that another subscriber station, which transmitted its request for access at a later instant, has received an authorization for access,
    wherein the subscriber station, when transmitting a request for access, stores an identification code which indicates the time rank of its request for access in the order of the requests for access, from further subscriber stations, occurring on a control channel.

2. A communication system as claimed in claim 1, characterized in that, when authorizations of different priorities are used, the subscriber station repeats the request for access, once it has established that another subscriber station of identical or lower priority, which transmitted its request for access at a later instant, has received an authorization for access.

3. A communication system as claimed in one of the claims 1, characterized in that there is a presettable time interval between the reception of the request for access and the granting of the authorization for access.

4. A communication system as claimed in one of the claims 1 to 3, characterized in that a control channel is organized in numbered time slots and in that the subscriber station stores a time slot number as an identification code in a register (32), which time slot number corresponds with the number of the time slot in which the subscriber station has transmitted its request for access.

5. A communication system as claimed in claim 4, characterized in that, for identifying the position of the request for access, the authorization for access contains an authorization number, which authorization number always corresponds with the number of the time slot in which the subscriber station has transmitted its request for access.

6. A communication network as claimed in claims 5, characterized in that a first comparator (33) in the subscriber station compares the authorization numbers contained in the received authorizations for access to the stored time slot number.

7. A communication system as claimed in claim 1, characterized in that the authorization for access contains a number derived from a number of time slots situated between the reception of a request for access and the transmission of this authorization for access.

8. A communication system as claimed in claim 7, characterized in that the subscriber station contains a counter (34) counting the time slots that have passed since the transmission of a request for access, and in that a first comparator (33) arranged in the subscriber station compares the counting position of the counter to a number contained in an authorization for access.

9. A communication system as claimed in claim 1, characterized in that the central arrangement transmits an authorization for access relating to an unavailable subscriber in period of time when there are few received requests for access.

10. A communication system as claimed in claim 1, characterized in that the subscriber station comprises a timing circuit, which is started when the request for access is transmitted, and in that another request for access is transmitted after a time interval, predetermined by means of the timing circuit, has elapsed, without any authorization for access having been received by the subscriber station.

11. A communication system as claimed in claim 6, further comprising
(a) a second register (35) for storing an access priority,
(b) a second comparator (36) for comparing the access priority with a priority, contained in the received access access authorization, and
(c) switching elements (37,38) for logically combining results of comparisons by the first comparator (33) and the second comparator (36).

12. A communication system as claimed in claim 1, characterized in that the communication system is a radio telephone network.

13. A communication system having at least one central arrangement and a plurality of mutually independent subscriber stations, in which a subscriber station, after transmission of a request for access, awaits an authorization for access to be granted by the central arrangement, characterized in that the subscriber station repeats its request for access, once it has established that another subscriber station, which transmitted its request for access at a later instant, has received an authorization for access,
wherein when authorizations of different priorities are used, the subscriber station repeats the request for access, once it has established that another subscriber station of identical or lower priority, which transmitted its request for access at a later instant has received an authorization for access.

14. The system of claim 13, wherein there is a presettable time interval between the reception of the request for access and the granting of the authorization for access.

15. A communication system having at least one central arrangement and a plurality of mutually independent subscriber stations, in which a subscriber station, after transmission of a request for access, awaits an authorization for access to be granted by the central arrangement, characterized in that the subscriber station repeats its request for access, once it has established that another subscriber station, which transmitted its request for access at a later instant, has received an authorization for access,
wherein the subscriber station comprises a timing circuit, which is started when the request for access is transmitted, and in that another request for access is transmitted after a time interval, predetermined by means of the timing circuit, has elapsed, without any authorization for access having been received by the subscriber station.

* * * * *